(12) United States Patent
Galles (10) Patent No.: US 7,752,360 B2
(45) Date of Patent: Jul. 6, 2010

(54) METHOD AND SYSTEM TO MAP VIRTUAL PCIE I/O DEVICES AND RESOURCES TO A STANDARD I/O BUS

(75) Inventor: Michael Galles, Los Altos, CA (US)

(73) Assignee: Nuova Systems, Inc., San Jose, CA (US)

( * ) Notice: Subject to any disclaimer, the term of this patent is extended or adjusted under 35 U.S.C. 154(b) by 211 days.

(21) Appl. No.: 11/749,639

(22) Filed: May 16, 2007

(65) Prior Publication Data

US 2008/0288661 A1 Nov. 20, 2008

(51) Int. Cl.
*G06F 3/00* (2006.01)
*G06F 15/16* (2006.01)

(52) U.S. Cl. .................. 710/62; 710/3; 710/8; 710/10; 710/306; 710/316

(58) Field of Classification Search .............. 710/3, 710/62, 22, 316, 8, 10, 306; 711/203; 709/1, 709/104, 250
See application file for complete search history.

(56) References Cited

U.S. PATENT DOCUMENTS

| | | | | |
|---|---|---|---|---|
| 7,287,114 | B2 * | 10/2007 | Sullivan ..................... | 710/316 |
| 7,529,860 | B2 * | 5/2009 | Freimuth et al. .............. | 710/8 |
| 2005/0268137 | A1 * | 12/2005 | Pettey ........................ | 713/400 |
| 2007/0266179 | A1 * | 11/2007 | Chavan et al. .............. | 709/250 |
| 2008/0127348 | A1 * | 5/2008 | Largman et al. .............. | 726/24 |
| 2008/0163171 | A1 * | 7/2008 | Chess et al. ................. | 717/120 |
| 2008/0163194 | A1 * | 7/2008 | Dias et al. ................... | 717/174 |
| 2008/0189720 | A1 * | 8/2008 | Moertl et al. ............... | 719/314 |
| 2008/0244595 | A1 * | 10/2008 | Eilam et al. ................. | 718/104 |

OTHER PUBLICATIONS

Website: http://www.thefreedictionary.com/template, The American Heritage® Dictionary of the English Language, Fourth Edition copyright © 2000 by Houghton Mifflin Company.*
David, A. R., "PCI", http://tldp.org/LDP/tlk/dd/pci.html, (1996).
Jack, Regula , "The PCE Express-Infiniband Connection", http://www.rtcmagazine.com/home/article.php?id=100680, (Jun. 2006).

* cited by examiner

*Primary Examiner*—Tammara Peyton
(74) *Attorney, Agent, or Firm*—Schwegman, Lundberg & Woessner, P.A.

(57) ABSTRACT

A method and system to map virtual I/O devices and resources to a standard I/O bus is provided. The system, in one example embodiment, comprises a virtual device detector, a resource allocator, and an activation module. The virtual device detector may be configured to detect an indication of a virtual Peripheral Component Interconnect Express (PCIe) device having an associated template. The resource allocator may allocate, based on the template, a plurality of resources required for the virtual PCIe device from a pool of available resources. The activation module may generate a set of entries in a resource mapping table, the set of entries corresponding to the allocated resources and defining the virtual PCIe device.

22 Claims, 11 Drawing Sheets

METHOD AND SYSTEM TO MAP VIRTUAL PCIE I/O DEVICES AND RESOURCES TO A STANDARD I/O BUS

FIELD

Example embodiments relate to method and system to map virtual input/output (I/O) devices and resources to a standard I/O bus.

BACKGROUND

A virtual device may be thought of as a device description that mimics a physical hardware device. Virtualization may be understood as an abstraction of resources, a technique that makes the physical characteristics of a computer system transparent to the user. For example, a single physical server may be configured to appear to the users as multiple servers, each running on a completely dedicated hardware. Such perceived multiple servers may be termed logical servers. On the other hand, virtualization techniques may make appear multiple data storage resources (e.g., disks in a disk array) as a single logical volume or multiple logical volumes, the multiple logical volumes not necessarily corresponding to the hardware boundaries (disks).

Some existing systems utilize a virtual machine monitor in order to achieve virtualization. A virtual machine monitor, often abbreviated as VMM, permits a user to create logical servers. A request from a network client to a target logical server typically includes a network designation of an associated physical server or a switch. When the request is delivered to the physical server, the VMM that runs on the physical server may process the request in order to determine the target logical server and to forward the request to the target logical server. When requests are sent to different services running on a server (e.g., to different logical servers created by a VMM) via a single physical I/O device, the processing at the VMM that is necessary to route the requests to the appropriate destinations may become an undesirable bottleneck.

A physical I/O device, e.g., a network adaptor, is typically configured such that there is a direct mapping of the resources to the memory addresses. A request directed to an I/O device, such as a request from a host to a network adaptor, includes a hard-coded address of a particular resource associated with the adaptor. When a request is received at the adaptor, the adaptor decodes the address and the request is processed utilizing the resource associated with the hard-coded address.

BRIEF DESCRIPTION OF DRAWINGS

Embodiments of the present invention are illustrated by way of example and not limitation in the figures of the accompanying drawings, in which like references indicate similar elements and in which.

DETAILED DESCRIPTION

An adaptor is described, termed consolidated I/O adaptor, to consolidate I/O functionality for a host computer system. A consolidated I/O adaptor, in one example embodiment, is a device that is connected to a processor of a host computer system via a Peripheral Component Interconnect Express® (PCIe) bus. A consolidated I/O adaptor may be configured with communications links that have an Ethernet link capability and a Fiber Channel (FC) link capability.

An example consolidated I/O adaptor may be capable of providing a scalable virtual I/O topology that comprises a plurality of virtual I/O devices. A variety of virtual I/O functions and resources may be created within a virtual I/O topology or within a single I/O device. A flexible mapping scheme allows mapping resources available at the consolidated I/O adaptor to memory-mapped control regions associated with the virtual I/O devices.

A virtual device created by a consolidated I/O adaptor (or simply adaptor), e.g., a virtual network interface card (virtual NIC or vNIC) or a virtual host bus adaptor (HBA), may be mapped to a particular host address range on the adaptor and may be configured to appear to the host computer system and to network users as a physical I/O device. In one example embodiment, a vNIC may be associated with a logical server or with a particular service (e.g., a particular web service) running on the logical server, in order to accommodate specific I/O needs of the host computer system. A logical server will be understood to include a virtual machine or a server running directly on the host processor but whose identity and I/O configuration is under central control.

In one example embodiment, a mechanism or a scheme to map resources available at the consolidated I/O adaptor to memory-mapped control regions associated with the virtual I/O devices may be implemented by using a pool of configurable PCIe Base Address Registers (BARs) coupled with a resource mapping table to store mapping information for each virtual I/O device. The I/O resources provided by the consolidated I/O adaptor may be mapped to host addresses in the framework of the PCIe standard such that the same device drivers that are utilized to communicate with physical PCIe devices may be utilized to communicate with corresponding virtual PCIe devices.

In order to create a virtual PCIe device, configuration software may be utilized to generate a relocateable BAR of programmable size that represents the host address window to the virtual PCIe device. The configuration software may reside, e.g., at the host computer system, at the consolidated I/O adaptor, or at a network management system. A resource mapping table, provided at the consolidated I/O adaptor, associates address offsets within the BAR with one or more I/O resources in the consolidated I/O adaptor. In one example embodiment, the association operation (or remapping) may be performed utilizing programmable address pointers and segment sizes, such that a particular I/O resource can be mapped into a standard device profile, e.g., into a PCIe device profile. The virtual PCIe devices may be created by the consolidated I/O adaptor dynamically, and be provided with a variety of desired combination of resources and a variety of desired host software interfaces. The desired combination of resources for a particular virtual PCIe device may be determined by a template associated with a new virtual PCIe device at the time the new virtual PCIe device is created.

It will be noted, that a flexible mapping scheme described herein may be utilized advantageously in the context of PCI-SIG I/O Virtualization (IOV) specifications. The PCI-SIG or Peripheral Component Interconnect Special Interest Group is a consortium within the electronics industry that is responsible for providing specifications for PCI, PCI-X, and PCIe computer buses. PCI-SIG, in conjunction with system virtualization technologies, specifies a mechanism where a single physical PCIe endpoint can expose multiple virtual functions. The techniques described herein may be utilized with respect to virtual functions, as well as with respect to virtual I/O devices.

An example embodiment of a system to map virtual I/O devices and resources to a standard I/O bus may be implemented in the context of a network environment. An example of such network environment is illustrated in FIG. 1.

Figure 1:
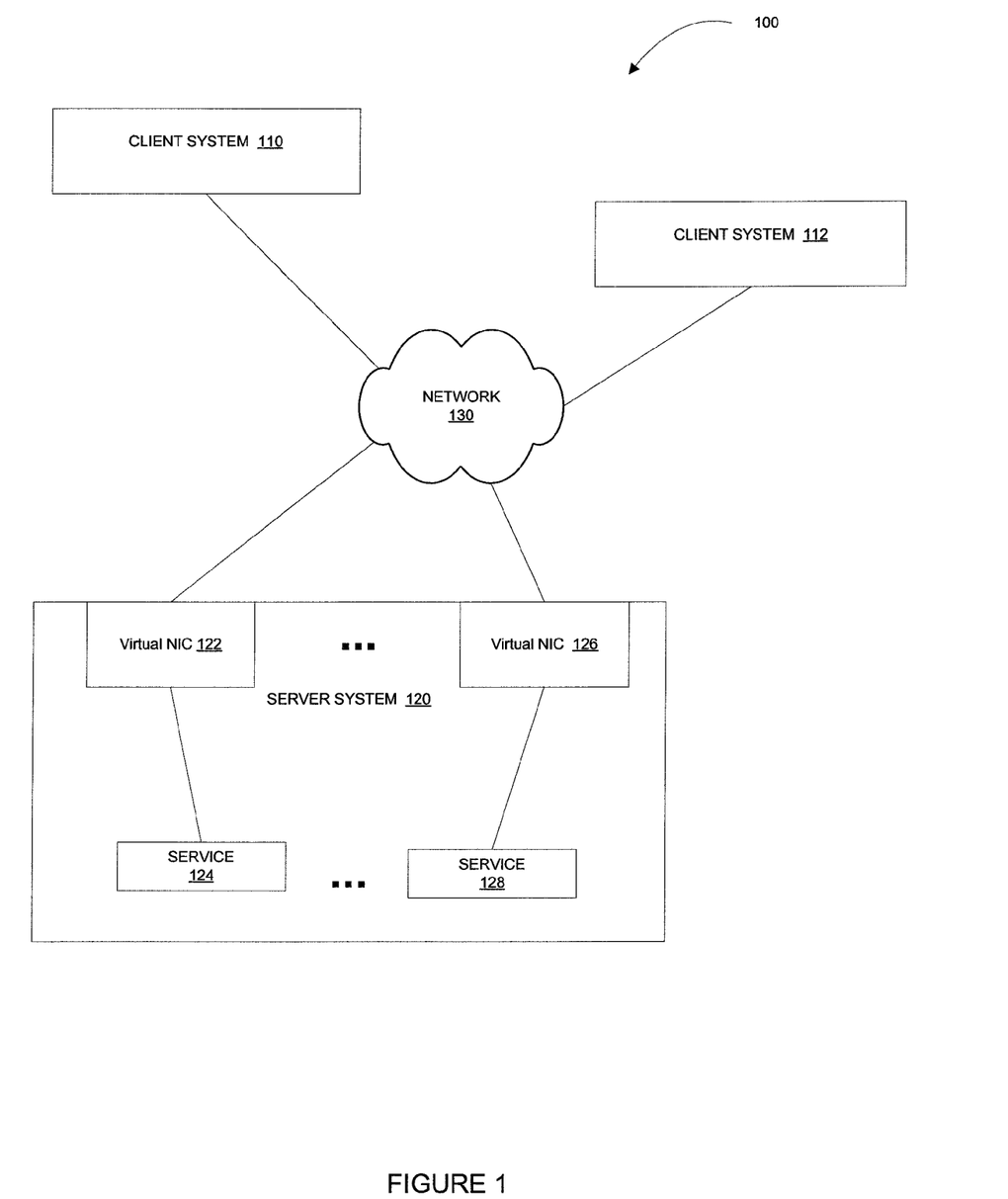
FIG. 1 is a diagrammatic representation of a network environment within which an example embodiment may be implemented.

As shown in FIG. 1, a network environment 100 may include a plurality of client computer systems, e.g., a client system 110 and a client system 112, and a server system 120. The client systems 110 and 112 and the server system 120 are coupled to a communications network 130. The communications network 130 may be a public network (e.g., the Internet, a wireless network, etc.) or a private network (e.g., LAN, WAN, Intranet, etc.). It will be noted, that the client system 110 and the client system 112, while behaving as clients with respect to the server system 120, may be configured to function as servers with respect to some other computer systems.

In an example embodiment, the server system 120 is one of the servers in a data center that provides access to a variety of data and services. The server system 120 may be associated with other server systems, as well as with data storage, e.g., a disk array connected to the server system 120, e.g., via a Fiber Channel (FC) connection or a small computer system interface (SCSI) connection. The messages exchanged between the client systems 110 and 112 and the server system 120, and between the data storage and the server system 120 may be first processed by a router or a switch.

The server system 120, in an example embodiment, may host a service 124 and a service 128. The services 124 and 128 may be made available to the clients 110 and 112 via the network 130. As shown in FIG. 1, the service 124 is associated with a virtual NIC 122, and the service 128 is associated with a virtual NIC 126. In one example embodiment, respective IP addresses associated with the virtual NIC 122 and the virtual NIC 126 are available to the clients 110 and 112. An example embodiment of the server system 120 is illustrated in FIG. 2.

Figure 2:
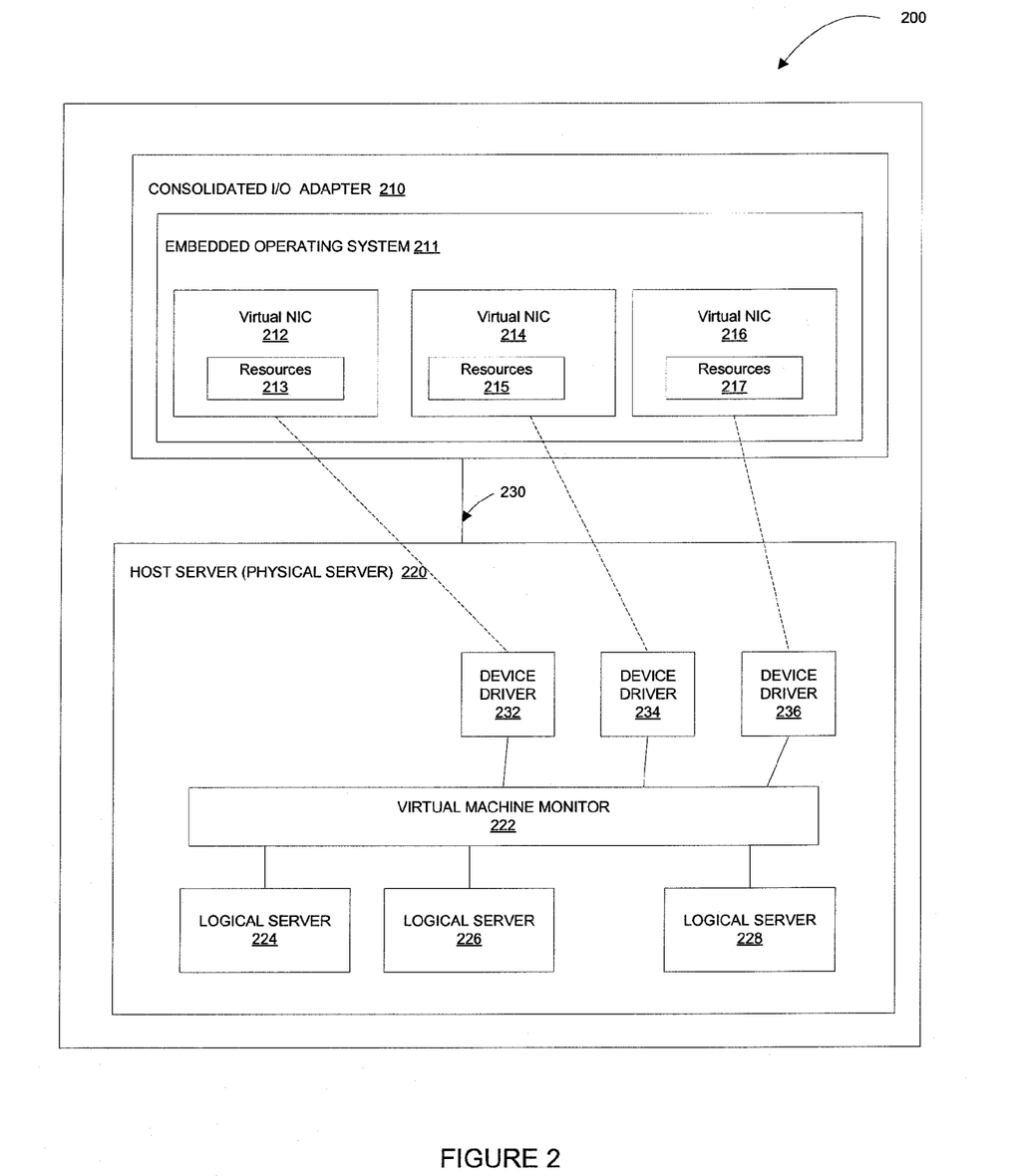
FIG. 2 is a diagrammatic representation of a server system, in accordance with an example embodiment.

Referring to FIG. 2, a server system 200 includes a host server 220 and a consolidated I/O adaptor 210. The consolidated I/O adaptor 210 is connected to the host server 220 by means of a PCIe bus 230. The consolidated I/O adaptor 210 is shown to include an embedded operation system 211 hosting multiple virtual NICs: a virtual NIC 212, a virtual NIC 214, and a virtual NIC 216. The virtual NIC 212 is configured with resources 213. The resources 213, in one embodiment are assigned to the virtual NIC 212 from a pool of resources of the consolidated I/O adaptor 210, such that the virtual NIC 212 has exclusive access to these resources. The virtual NIC 214 is configured with resources 215. The virtual NIC 216 is configured with resources 217. Each one of the virtual NICs 212, 214, and 216 has exclusive use of their respective resources and is not aware of any of the resources available at the consolidated I/O adaptor 210, whether assigned to other virtual NICs or not.

In one example embodiment, the consolidated I/O adaptor 210 is capable of supporting up to 128 virtual NICs. It will be noted that, in one example embodiment, the consolidated I/O adaptor 210 may be configured to have virtual PCI bridges and virtual host bus adaptors (vHBAs), as well as other virtual PCIe endpoints and connectivity devices, in addition to virtual NICs.

A PCIe device is typically associated with a host software driver. In one example embodiment, each virtual entity created by the consolidated I/O adaptor 210 that requires a separate host driver is defined as a separate device. As shown in FIG. 2, the virtual NIC 212 is associated with a device driver 232 present on the host server 220. The virtual NIC 214 is associated with a device driver 232. The virtual NIC 216 is associated with a device driver 232. Every PCIe device has at least one associated entry in a configuration space table, which allows the host software to perform various functions, such as detecting PCIe devices after reset or hot plug events, identifying the vendor and function of each PCIe device, discovering what system resources (e.g. memory address space, interrupts, etc.) are required by each PCIe device, assigning system resources to each PCIe device, enabling or disabling the ability of the PCIe device to respond to memory or I/O accesses, instructing the PCIe device on how to respond to error conditions, programming the routing of PCIe device interrupts, as well as other functions.

The host server 220, as shown in FIG. 2, may include a virtual machine monitor (VMM) 222 and plurality of logical servers 224 and 226 (e.g., implemented as guest operating systems). The logical servers created by the VMM 222 may be referred to as virtual machines. In one example embodiment, the host server 220 may be configured such that the network messages directed to the logical server 224 are processed via the virtual NIC 212, while the network messages directed to the logical server 226 are processed via the virtual NIC 214. The network messages directed to a logical server 228 are processed via the virtual NIC 218.

In one example embodiment, the consolidated I/O adaptor 210 has an architecture, in which the identity of the consolidated I/O adaptor 210 (e.g., the MAC address and configuration parameters) is managed centrally and is provisioned via the network. In addition to the ability to provision the identity of the consolidated I/O adaptor 210 via the network, the example architecture may also provide an ability for the network to provision the component interconnect bus topology, such as virtual PCIe topology. An example virtual topology hosted on the consolidated I/O adaptor 210 is discussed further below, with reference to FIG. 10.

In one example embodiment, each virtual NIC (virtual NIC 212, virtual NIC 214, and virtual NIC 216) has a distinct MAC address, so that these virtual devices, that may be virtualized from the same hardware pool, appear as separate physical devices when viewed from the network or from the host server 220. A client that connects to the virtual NIC 212 may communicate with the logical server 224 in the same manner as if the logical server 224 was a dedicated physical server. If a packet is sent from a client to the logical server 224 via the virtual NIC 212, the packet targets the IP address and the MAC address associated with the virtual NIC 212.

The virtual NICs 212, 214, and 216, as well as other virtual PCIe devices may be created on-demand, utilizing a user interface presented to a system administrator. A request to create a virtual communications device in a PCIe topology may be referred to as a management command and may be directed to a management CPU provided at the consolidated I/O adaptor 210.

Figure 3:
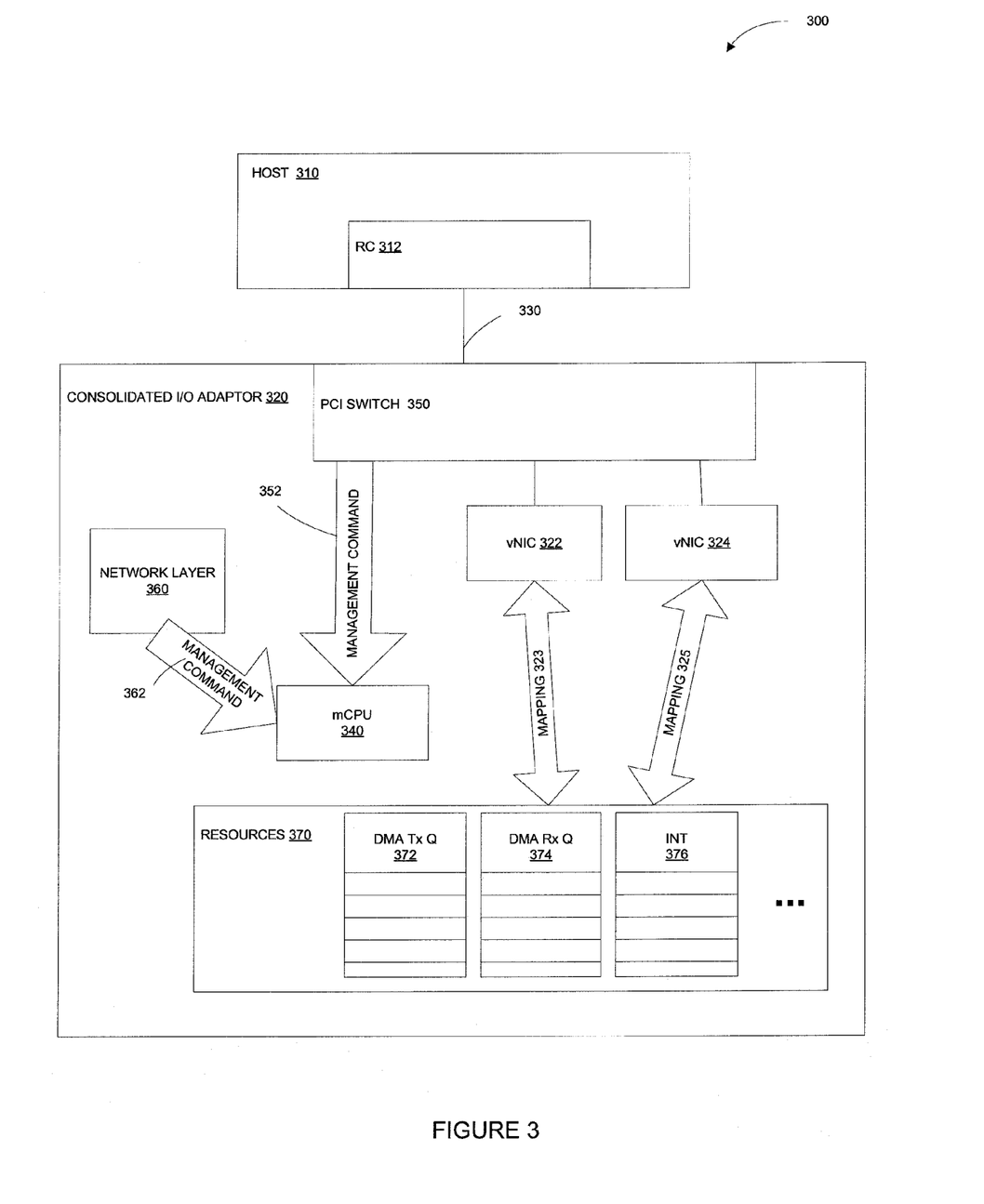
FIG. 3 is a block diagram illustrating a server system including a management CPU that is configured to receive management commands, in accordance with an example embodiment.

FIG. 3 is a block diagram illustrating a server system 300 including a host server 310 and a consolidated I/O adaptor 320. The host server 310 and the consolidated I/O adaptor 320 are connected by means of a PCIe bus 330 via an RC 312 of the host server 310 and a PCI switch 350 of the consolidated I/O adaptor 320. The consolidated I/O adaptor 320 is shown to include a management CPU 340, a network layer 360, a pool of resources 370, and virtual NICs 322 and 324. The management CPU 340, in one example embodiment, may receive management commands from the host server 310 via the PCI switch 350, as well as from the network via the network layer 360, as indicated by blocks 352 and 362.

Virtual NICs 322 and 324 use memory and I/O base address registers (BARs) to map PCIe addresses to device functions. Before any of the functions of a virtual PCIe device (e.g., virtual NICs 322 and 324) can be used, one or more BARs corresponding to the virtual PCIe device are programmed in a PCIe configuration space presented to the host server 310. The size of a BAR may be set by the management CPU 340, at the time when the management CPU 340 configures the virtual PCIe device. The base address associated with the virtual PCIe device is set by the host server 310 after the virtual PCIe device is detected and mapped into its PCIe address space. A PCIe address space that is maintained at the consolidated I/O adaptor 320 and that corresponds to a particular virtual PCIe device may be referred to as an address window. An address window, in one example embodiment, includes all of the control registers and memory mapped interfaces required to operate the virtual PCIe device.

In one example embodiment, the consolidated I/O adaptor 320 supports multiple types of virtual PCIe devices, and a given device type presents at least one BAR in its configuration space. An address map associated with a virtual PCIe device BAR may vary in size, depending on the resources allocated to the virtual PCIe device (e.g., the number of receive queues) as well as host requirements, such as support for 32 bit or 64 bit addressing. The virtual PCIe device addressing may be accomplished through a series of table lookups and address logic, as will be described further below. These techniques may be used advantageously to support a variety of known PCIe device types, arbitrary future device types, as well as flexible resource allocation and forward-looking compatibility address layout.

Returning to FIG. 3, the virtual NIC 322 has access to a subset of resources from the pool of resources 370 by virtue of a mapping mechanism 323. The virtual NIC 324 has access to a subset of resources from the pool of resources 370 by virtue of a mapping mechanism 325. The resources in the pool of resources 370 include, in one example embodiment, direct memory access (DMA) transmit (Tx) queues 372, DMA receive (Rx) queues 372, Interrupts 374, and other resources. In one example embodiment, the virtual NIC 322 is of type Ethernet and may require multiple Tx queues, multiple Rx queues, multiple completion or notification queues, multiple interrupt resources, network unicast and multicast filtering resources, network statistics gathering resources, and a configuration information resource for communicating resource information to the host driver or operating system. These required resources may be assigned (via mapping) to the virtual NIC 322 for its exclusive use. As a result, the virtual NIC 322 appears to the host system indistinguishable from a physical NIC that may be accessed utilizing device drivers configured to communicate with such physical NIC.

When a new virtual PCIe device is created by a consolidated I/O adaptor connected to a host server via a PCIe bus, the new virtual PCIe device is provided with a configuration header in accordance with the requested type for the new virtual PCIe device. The configuration header may be stored in the memory of the consolidated I/O adaptor.

Figure 4:
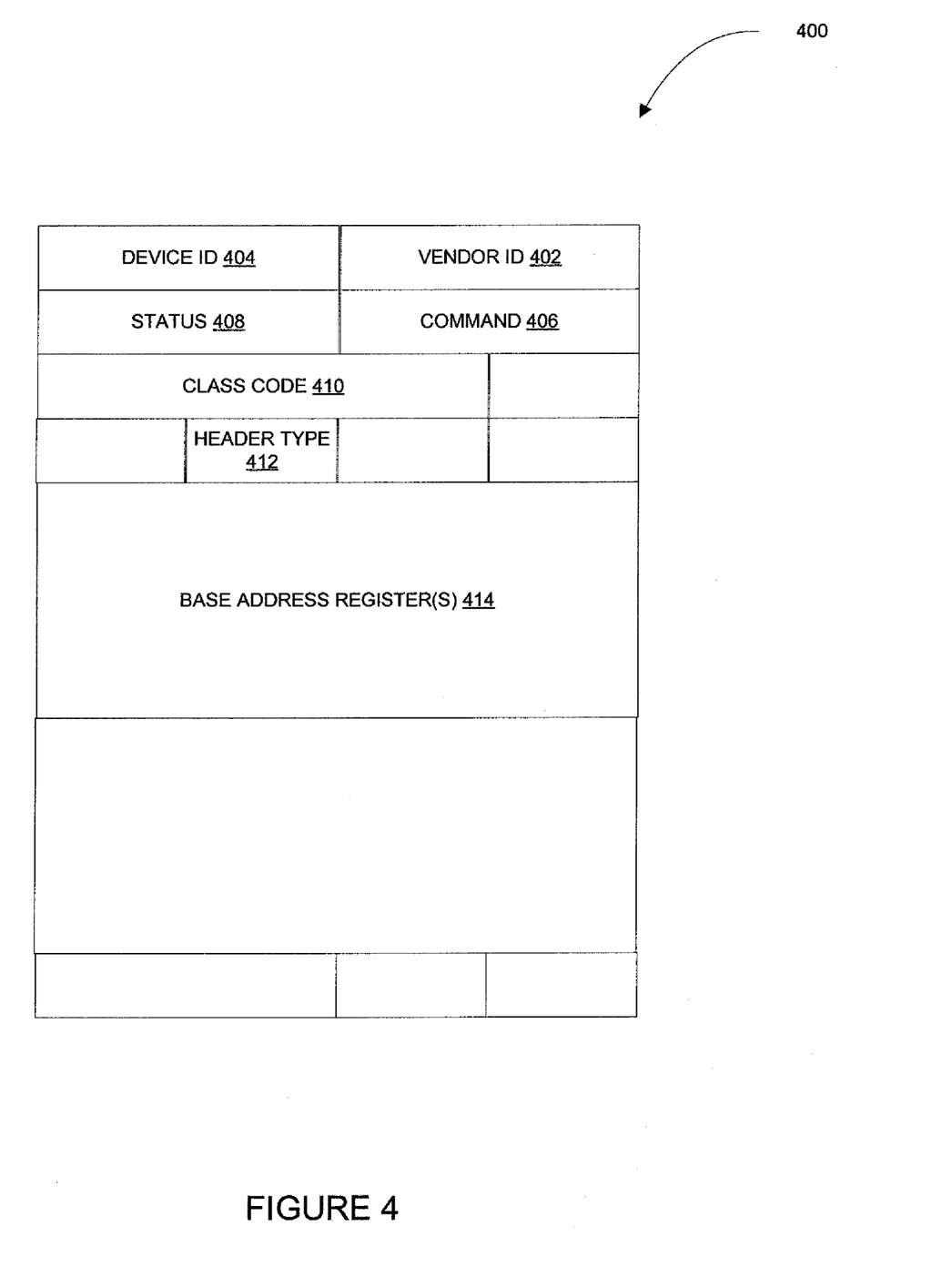
FIG. 4 is a diagrammatic representation of a PCIe configuration header that may be utilized in accordance with an example embodiment.

FIG. 4 is a diagrammatic representation of a PCI Express configuration header 400 that may be utilized in accordance with an example embodiment. As shown in FIG. 4, the header 400 includes a number of fields. When the host CPU scans the PCI Express bus, it detects the presence of a PCI Express device by reading the existing configuration headers. A Vendor ID Register 402 identifies the manufacturer of the device by a code. In one example embodiment, the value FFFFh is reserved and is returned by the host/PCI Express bridge in response to an attempt to read the Vendor ID Register field for an empty PCI Express bus slot. A Device ID Register 404 is a 16-bit value that identifies the type of device. The contents of a Command Register specify various functions, such as I/O Access Enable, Memory Access Enable, Master Enable, Special Cycle Recognition, System Error Enable, as well as other functions.

A Status Register 408 may be configured to maintain the status of events related to the PCI Express bus. A Class Code Register 410 identifies the main function of the device, a more precise subclass of the device, and, in some cases, an associated programming interface.

A Header Type Register 412 defines the format of the configuration header. As mentioned above, a Type 0 header indicates an endpoint device, such as a network adaptor or a storage adaptor, and a Type 1 header indicates a connectivity device, such as a switch or a bridge. The Header Type Register 412 may also include information that indicates whether the device is unifunctional or multifunctional.

A new virtual PCIe device may be created, e.g., in response to a request from a user with administrator's privileges. The next step after a new virtual PCIe device is first created, may be to provide the new virtual PCIe device with necessary resources from the pool of resources available at the consolidated I/O adaptor. This may be accomplished by associating the required resources with the new virtual PCIe device, which, in turn, provides a mapping of the new virtual PCIe device and its resources to the PCIe bus. An example system to map a virtual PCIe device and resources to a PCIe bus, may be discussed with reference to FIG. 5.

Figure 5:
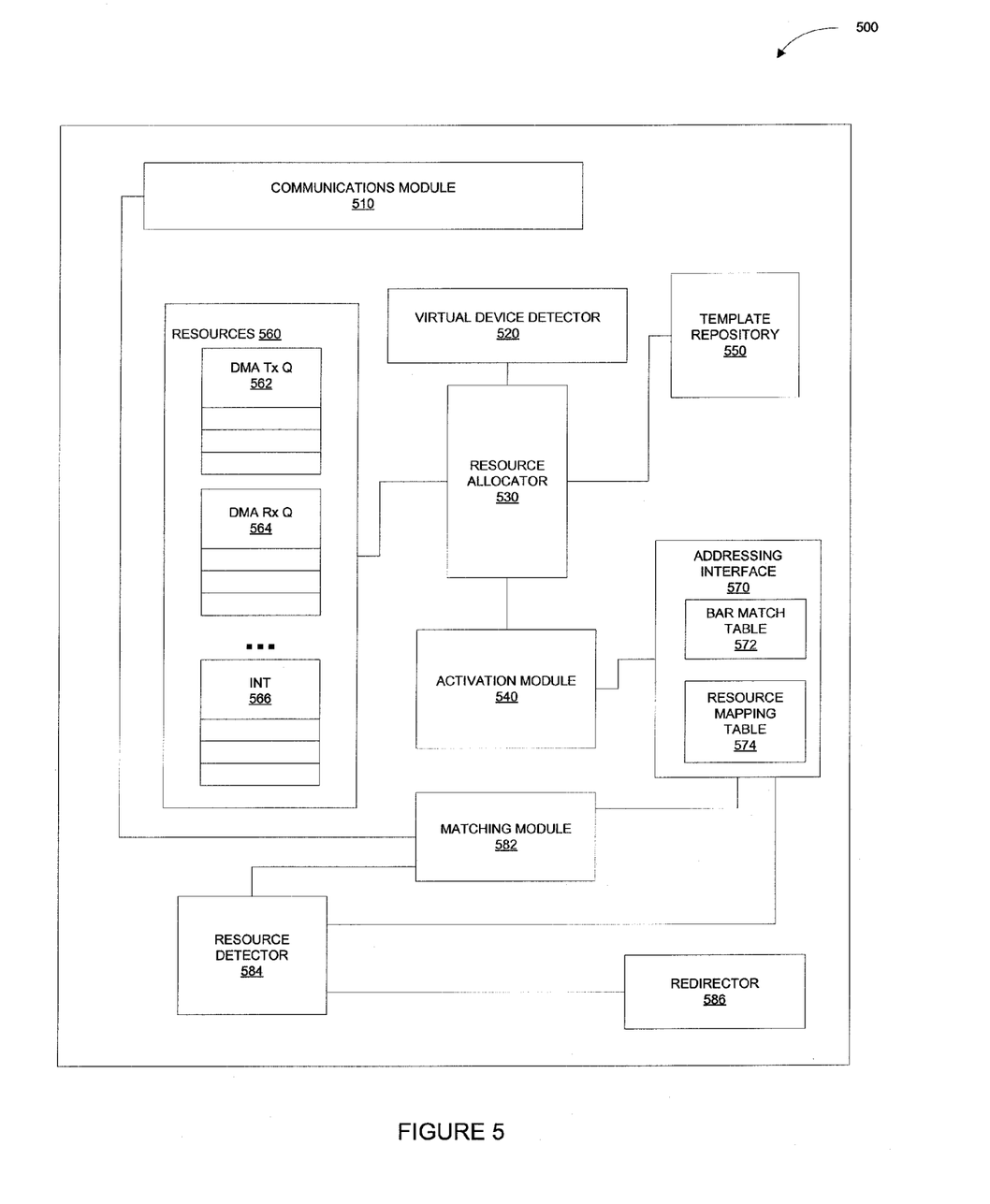
FIG. 5 is a diagrammatic representation of an example system to map virtual I/O devices and resources to a standard I/O bus, in accordance with an example embodiment.

FIG. 5 illustrates a system 500 to map a virtual I/O device and resources to an I/O bus. The system 500, in one example embodiment, comprises a virtual device detector 520, a resource allocator 530, and an activation module 540. The virtual device, detector 520 may be configured to detect that a new virtual PCIe device was created and that the new device now needs to be assigned various resources in order to provide the new virtual PCIe device with the functionality of a physical PCIe device. The resource allocator 530 may be configured to determine what resources are required for the new virtual PCIe device by interrogating a template associated with the new virtual PCIe device. Various templates that correspond to different types of PCIe devices may be stored in a template repository 550.

The resource allocator 530 may allocate the resources required for the new virtual PCIe device from a pool of resources 560. The pool of resources 560 may include a variety of resources, such as DMA transmit queues (Tx Q) 562, DMA receive queues (Rx Q) 562, interrupts 566, etc. The activation module 540 may be configured to detect that the resources required for the new virtual PCIe device have been allocated and generate a set of entries in a resource mapping table 574, such that the set of entries define the new virtual PCIe device. The resource mapping table 574, together with a BAR match table 272 may be included in an addressing interface 570. The entries in the BAR match table 272, generated by the host system, may include one or more BARs for each virtual PCIe device.

As shown in FIG. 5, the system 500 includes a communications module 510 that may be configured to receive access requests directed to virtual PCIe devices maintained by the consolidated I/O adaptor. Access requests are processed, in one example embodiment, utilizing a matching module 582, a resource detector 584, and a redirector 586. The matching module 582 may be configured to match the BAR information that is included with the access request with an entry in the BAR match table 572. The resource detector 584 may be configured to determine an entry in the resource mapping table 574, based on the BAR entry determined by the matching module 582. The redirector 584 may be configured to utilize the information determined utilizing the resource mapping table 574, as well as additional offset information that may be extracted from the request, to redirect the request to be processed at a particular target resource register.

Figure 6:
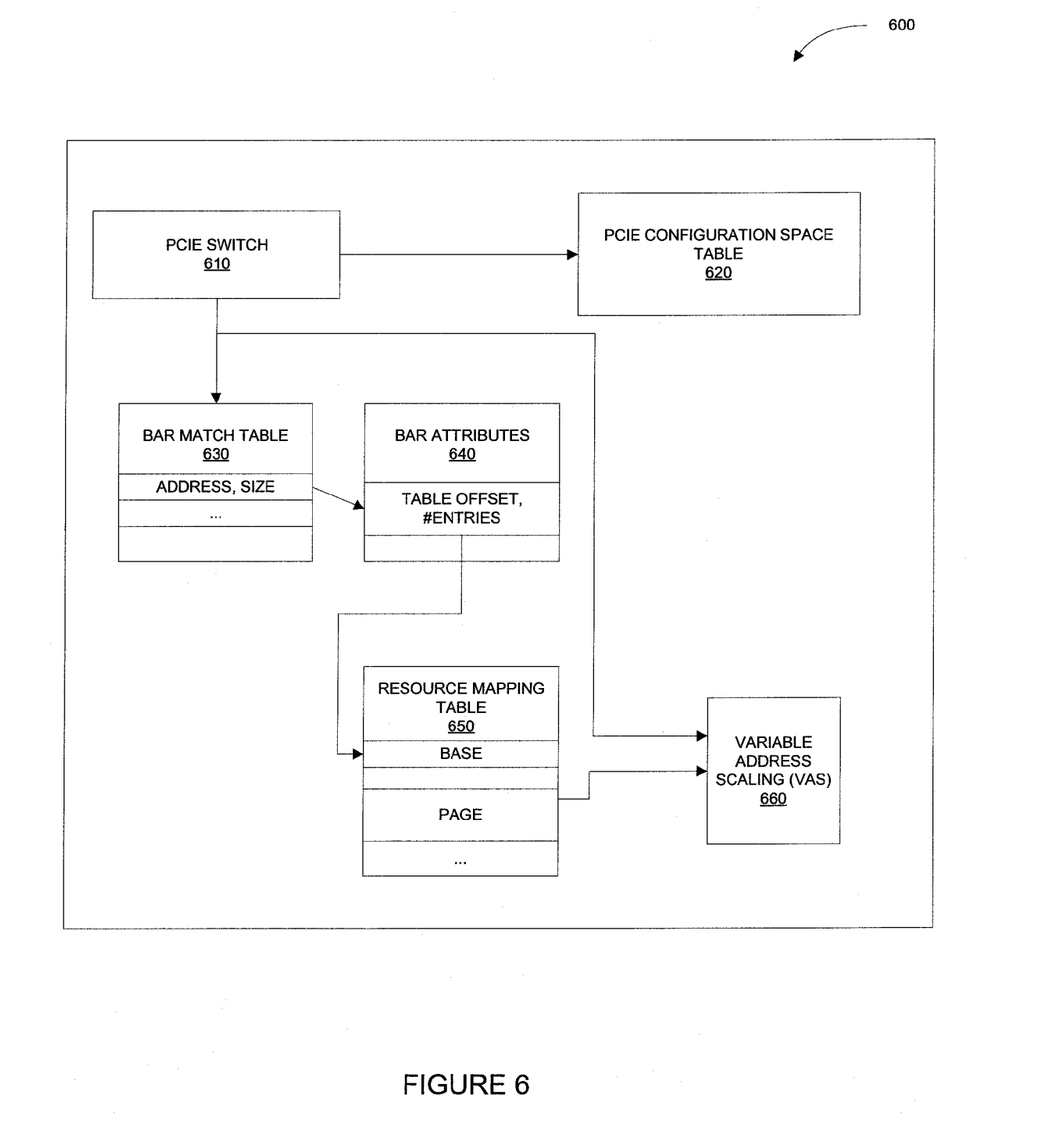
FIG. 6 is a hardware view of device address mapping, in accordance with an example embodiment.

FIG. 6 is a hardware view of an example device address mapping system 600 that may be included with a consolidated I/O adaptor. The system 600, in one example embodiment includes a PCIe switch 610, a PCIe configuration space table 620, a BAR match table 630, BAR attributes logic 640, a resource mapping table 650, and variable address scaling logic 660. The PCIe configuration space table 620 may be provided with direct memory access (DMA) to PCIe configuration spaces in the memory of the consolidated I/O adaptor.

In one example embodiment, PCIe memory transactions arrive at the system 600 with 64 bit PCIe transaction addresses. A PCIe transaction address is sent to the BAR match table 630, which performs a fully associative lookup and comparison across all BAR entries in the BAR match table 630. The fully associative lookup performed with respect to the PCIe transaction address received via the PCIe switch 610 may result in a match index. The BAR attributes logic 640 may be utilized to determine, based on the match index, an associated entry in the resource mapping table 650, which, in turn, may point to a physical resource in the address space of the consolidated I/O adaptor.

The BAR match table 630 may be implemented as a cache backed by the full BAR table in the memory of the consolidated I/O adaptor. The full BAR table may be a direct mapped storage structure in the program memory of the firmware associated with the consolidated I/O adaptor. In one embodiment, the fully associative BAR match table 630 is configured to have 256 entries to accommodate 256 BARs. A management CPU associated with the system 600 may be configured to program the BAR match table 630 in the memory of the consolidated I/O adaptor. The hardware associated with the system 600 may be configured to manage the cache (e.g., in the form of the BAR match table 630) and to perform a match search automatically. In one example embodiment, valid BAR entries in the BAR match table 630 may be provided for all configured and activated virtual PCIe devices. Each BAR may also appear in the PCIe configuration space table 620, such that the entries in the PCIe configuration space table 620 correspond to the entries in the PCIe BAR match table 630.

If a configuration of the consolidated I/O adaptor requires more than 256 BARs, the firmware in the consolidated I/O adaptor (or simply firmware) may initially load the first 256 BARs into the BAR match table 630. When a PCIe address arrives from an associated host, e.g., the host 310 of FIG. 3, the firmware compares all its BARs to the received PCIe address. If the received PCIe address does not match any of the BARs stored in the BAR match table 630 that serves as cache, the firmware locates a BAR that matches the received PCIe address in the full BAR table. The host request associated with the received PCIe address is then being processed. The firmware may also populate the BAR match table 630 with the BAR from the full BAR table that matches the received PCIe address and evict a less used BAR stored in the BAR match table 630.

An example format of the BAR match table 630 of the consolidated I/O adaptor is provided below in Table 1.

TABLE 1

| Field | Bits | Description |
| --- | --- | --- |
| BAR address | 48 | Base address of BAR in PCIe space. This base address must be naturally aligned to the BAR size, as described in the PCIe spec. The host CPU writes the BAR address. |
| BAR valid | 1 | BAR entry is valid |
| BAR type | 3 | 0: 32 bit Memory BAR<br>1: 32 bit Memory BAR, must be set below 1 MB<br>2: 64 bit Memory BAR<br>3: Reserved<br>4: I/O BAR (32 bit only, avoid when possible)<br>5-7: Reserved |
| BAR size | 5 | Size of BAR.<br>0: BAR is 1 byte<br>1: BAR is 2 bytes<br>2: BAR is 4 bytes<br>. . .<br>31: BAR is 2 GB |
| Remap Size | 5 | Defines the size of each entry in the Resource Mapping table of the consolidated I/O adaptor for this BAR.<br>0: each remap entry is 1 byte of PCIe address<br>1: each remap entry is 2 bytes of PCIe address<br>2: each remap entry is 4 bytes of PCIe address<br>3: each remap entry is 8 bytes of PCIe address<br>4: each remap entry is 16 bytes of PCIe address<br>. . .<br>12: each remap entry is 4096 bytes of PCIe address, 4K mapping is the default value<br>. . .<br>20: each remap entry is 1 M bytes of PCIe address<br>. . .<br>31: each remap entry is 2 G bytes of PCIe address |
| Resource Offset | 12 | Offset into the Resource Mapping table of the consolidated I/O adaptor, points to base of remap array for this device |
| Resource Size | 12 | Number of entries in the Resource Mapping table of the consolidated I/O adaptor for this virtual PCIe device. If an address hits in the BAR but exceeds the number of assigned remap entries, a target abort results. |

When a PCIe address matches a BAR in the BAR match table 630, the following equation is used to determine the resource table index (or the match index):

Resource Index=Resource Offset+2^(BAR size−
Remap Size) PCIe target abort if 2^(BAR size−
Remap Size)>Resource Size For example, a 64K BAR that uses 16 consolidated I/O adaptor resource entries of 4K each may be programmed as follows:

BAR size=16;
Remap Size=12;

Alternatively, a 64K BAR that uses 1 consolidated I/O adaptor resource entry of 64K would be programmed as follows:

BAR size=16;
Remap Size=16;

In one example embodiment, each entry in the BAR match table 730 points to one or more entries in the resource mapping table 750. This defines a set of resources mapped by the BAR. This level of indirection may allow a variable number of resources to be mapped to a BAR in any order. The resource mapping table 750 may also include read/write permission bits and address scaling fields. Any access that violates permission or falls outside of the programmed size may cause a target abort. Each entry in the resource mapping table 750 may point to a variable sized region of the address space of the consolidate I/O adaptor, creating a direct mapping between the BAR addresses and the physical addresses of the consolidated I/O adaptor. The lower bits of the PCIe BAR address may be used to create the same lower bits of the physical addresses of the consolidated I/O adaptor. As shown in FIG. 6, the system 600 may include the variable address scaling logic 660 that may be utilized in order to conserve PCIe space. For example, a single entry in the resource mapping table 650 may correspond to more than one resource of the consolidated I/O adaptor. In another example, multiple entries in the resource mapping table 650 may correspond to a single resource of the consolidated I/O adaptor.

An example format of the resource mapping table 650 is provided below in Table 2.

TABLE 2

| Field | bits | Description |
|---|---|---|
| base address | 32 | base address of mapping region of the consolidated I/O adaptor |
| Resource size | 32 | Size of the resource being mapped. Access outside this size will cause a target abort. |
| VAS Mask size | 5 | Variable address scaling mask. Starting with the Least Significant Bit (LSB), all PCIe address bits which fall within the VAS Mask size are preserved with no scaling.<br>0: use shifted address only<br>1: Use PCIe address[0] + shifted address (preserve byte offset)<br>2: Use PCIe address[1:0] + shifted address<br>3: Use PCIe address[2:0] + shifted address (preserve word offset)<br>4: Use PCIe address[3:0] + shifted address<br>, , ,<br>31: Use PCIe address[30:0] + shifted address |
| VAS Shift | 5 | Variable address scaling shift. Address bits not masked are shifted by this amount.<br>0: PCIe address not shifted<br>1: PCIe address shifted by 1 bit position<br>2: PCIe address shifted by 2 bit positions<br>. . .<br>31: PCIe address shifted by 31 bit positions |
| VAS Shift Direction | 1 | Variable address scaling direction.<br>0: Shift PCIe address right<br>1: Shift PCIe address left |
| IW | 1 | Region has host write permission |
| V | 1 | Region valid |

Example address transformation for an individual entry in the resource mapping table 650 may be as follows:

Resource Offset=((BAR offset&((2^VAS Mask size)−1))|(~((2^VAS Mask size)−1)& (VAS Shift? (BAR offset<<VAS shift):(BAR offset>>VAS shift));

Consolidated I/O Adaptor Address=Consolidated I/O Adaptor Base Address+Resource Offset;

If (Resource Offset>Resource Size)PICe target abort; /*out of bounds*/

If (((BAR offset>>VAS Mask size)&((2^VAS shift)−1)!=0)&VAS Shift Direction&VAS shift)PCIe target abort; /*VAS compressed non-0 bits*/

Example 1

Left VAS shifting. A smaller PCIe BAR may need to be expanded into a larger address space of the consolidated I/O adaptor in order to preserve PCIe address space for 32 bit operating systems. If a 4K PCIe BAR maps into 16 separate Palo resources, each being 256 bytes, the remapping table entry is programmed as follows:

VAS Mask size=8; /*2^8 bytes per resource*/
VAS Shift=4; /*2^12 BAR size−2^8 bytes per resource*/
VAS Shift direction=1;

Example 2

No VAS shifting. When a 1 to 1 mapping between the PCIe and BAR offset is desired, simply set the VAS shift to 0. The VAS Mask size and VAS Shift direction do not matter when the VAS Shift is 0:

VAS Shift=0;

Example 3

Right VAS Shifting. A larger PCIe BAR can be compressed into a smaller Palo address space. This might be done when the host needs a window into Palo memory, but wants page level protection on 64 byte data structures, as in this example. Note that for this example, the BAR size would need to be 4K times the number of data structures:

VAS Mask size=6; /*2^6=64 bytes*/
VAS Shift=6; /*2^12 BAR page size=2^6 bytes per resource or data structure
VAS Shift direction=0;

The combination of the BAR remap size and the consolidated I/O adaptor resource variable address scaling may allow large regions of memory to be mapped in efficiently. Use Examples of this technique include mapping PCI expansion read-only memory (ROM) to flash space, mapping large segments of memory to support large number of data structures for Inter-Process Communication (IPC), mapping large segments of memory to achieve almost any device behavior that requires large buffers visible by the host, or mapping the entire address space of the consolidated I/O adaptor to the host system for debug functions.

Figure 7:
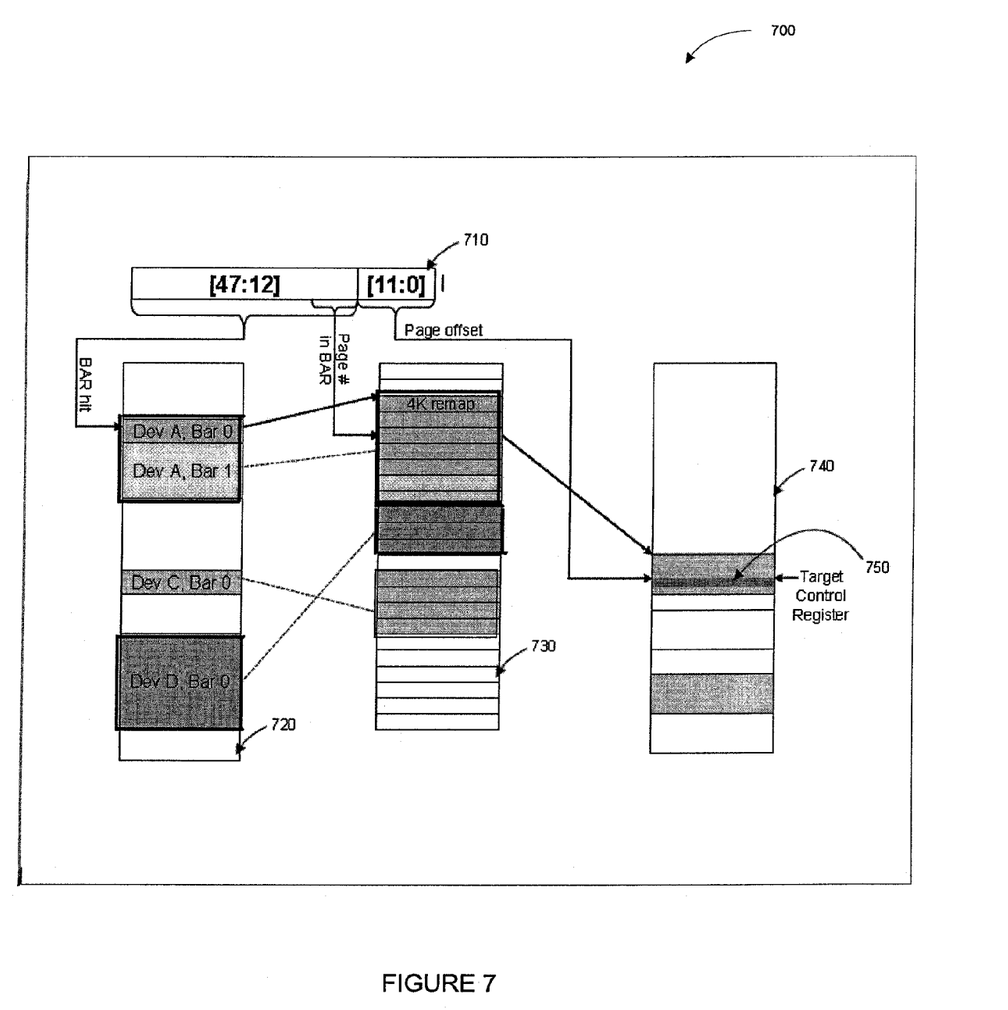
FIG. 7 is a software view of device address mapping, in accordance with an example embodiment.

FIG. 7 is a software view 700 of an example device address mapping system 700 that may be utilized within a consolidated I/O adaptor. As shown in FIG. 7, the last 36 bits of a host PCIe address 710 identify the target BAR and the page number (or a resource) within that BAR. The first 12 bits of the host PCIe address 710 identifies the page offset (a particular target control register or target entry) within that resource. The target BAR information in the host PCIe address 710 may be used to determine a virtual PCIe device in the host configuration space 720. The information identifying the page number (or a resource) provided in the host PCIe address 710 may be used, together with the determined virtual PCIe device, to determine a particular resource in a resource mapping table 730. Finally, the target entry information that is present in the host PCIe address 710 may be used, together with the determined particular resource in the resource mapping table 730, to determine the address of a physical resource in a physical address space 740 of the consolidated I/O adaptor.

The example operations performed by the system to map a virtual I/O device and resources to a standard I/O bus (e.g., by the system 500 of FIG. 5) may be described with reference to FIG. 8.

Figure 8:
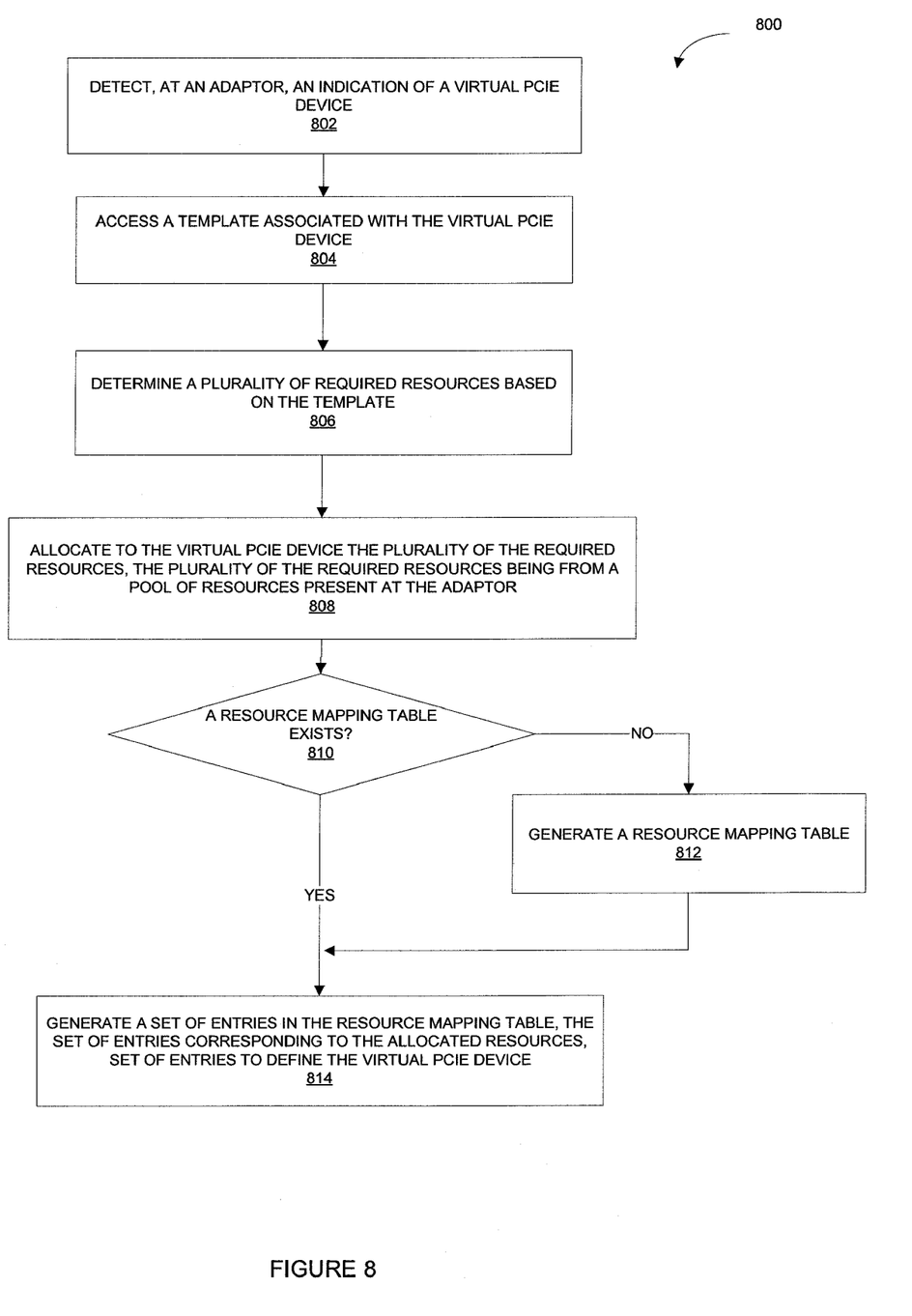
FIG. 8 is a flow chart of a method to map virtual I/O devices and resources to a standard I/O bus, in accordance with an example embodiment.

FIG. 8 is a flow chart of a method 800 to map a virtual I/O device and resources to a standard I/O bus, in accordance with an example embodiment. The method 800 may be performed by processing logic that may comprise hardware (e.g., dedicated logic, programmable logic, microcode, etc.), software (such as run on a general purpose computer system or a dedicated machine), or a combination of both. In one example embodiment, the method 800 may be performed by the various modules discussed above with reference to FIG. 5. Each of these modules may comprise processing logic.

As shown in FIG. 8, at operation 802, the device detector 520 detects an indication of a virtual PCIe device generated by a consolidated I/O adaptor. The virtual PCIe device may have a template associated with it, but not yet the resources necessary for the operation of the virtual device. The resource allocator 530 accesses, at operation 804, the template associated with the virtual PCIe device and determines a plurality of required resources based on the template, at operation 806. The resource allocator 530 allocates to the virtual PCIe device the plurality of required resources from the pool of resources that may be available at the consolidated I/O adaptor. The control is then passed to the activation module 540.

At operation 810, the activation module 540 determines whether a resource mapping table already exists, and creates a resource mapping table if it does not, at operation 812. At operation 814, the activation module 540 generates a set of entries in the resource mapping table. The set of entries correspond to the allocated resources and define the virtual PCIe device. From the perspective of the host, the virtual PCIe device is now capable of operating in the same manner as a physical PCIe device.

As mentioned above, a virtual I/O device may be treated by the host system in the same manner as a physical I/O device. The example operations performed by the system 500 to process an access request directed at a virtual I/O device may be described with reference to FIG. 9.

Figure 9:
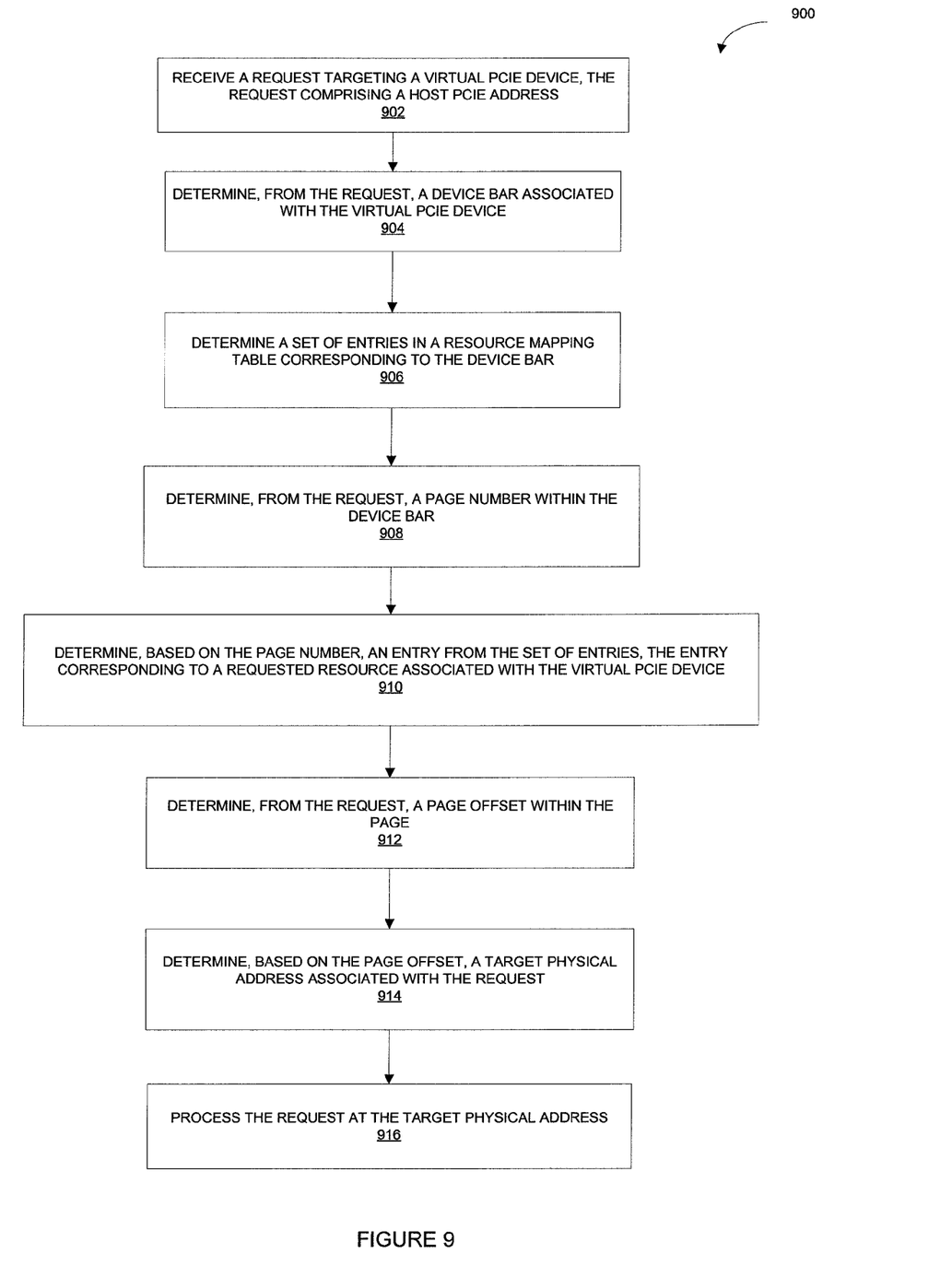
FIG. 9 is a flow chart of a method to process a request directed at a virtual I/O device, in accordance with an example embodiment.

FIG. 9 is a flow chart of a method 900 to process an access request directed at a virtual I/O device, in accordance with an example embodiment. The method 900 to access a service may be performed by processing logic that may comprise hardware (e.g., dedicated logic, programmable logic, microcode, etc.), software (such as run on a general purpose computer system or a dedicated machine), or a combination of both. In one example embodiment, the method 800 may be performed by the various modules discussed above with reference to FIG. 5. Each of these modules may comprise processing logic.

As shown in FIG. 9, at operation 902, the communications module 510 receives a request that targets a virtual PCIe device. The request includes a host PCIe address associated with the virtual PCIe device. At operation 904, the matching module 582 determines, from the request, a device BAR associated with the virtual PCIe device, utilizing the BAR match table 572. The matching module 582 next, at operation 906, determines a set of entries in the resource mapping table 574 that correspond to the device BAR and a page number within the device BAR (operation 908). The page number may correspond to one or more homogenous resources associated with the virtual PCIe device. At operation 910, the matching module 582 determines, based on the page number, a particular entry in the resource mapping table 574. Based on the page offset, which can also be determined from the request (at operation 912), the matching module 582 determines the target physical address associated with the request at operation 914. The redirector 586 can now identify the target physical address to a processor so that the processor can use the associated physical resource to process the request.

Figure 10:
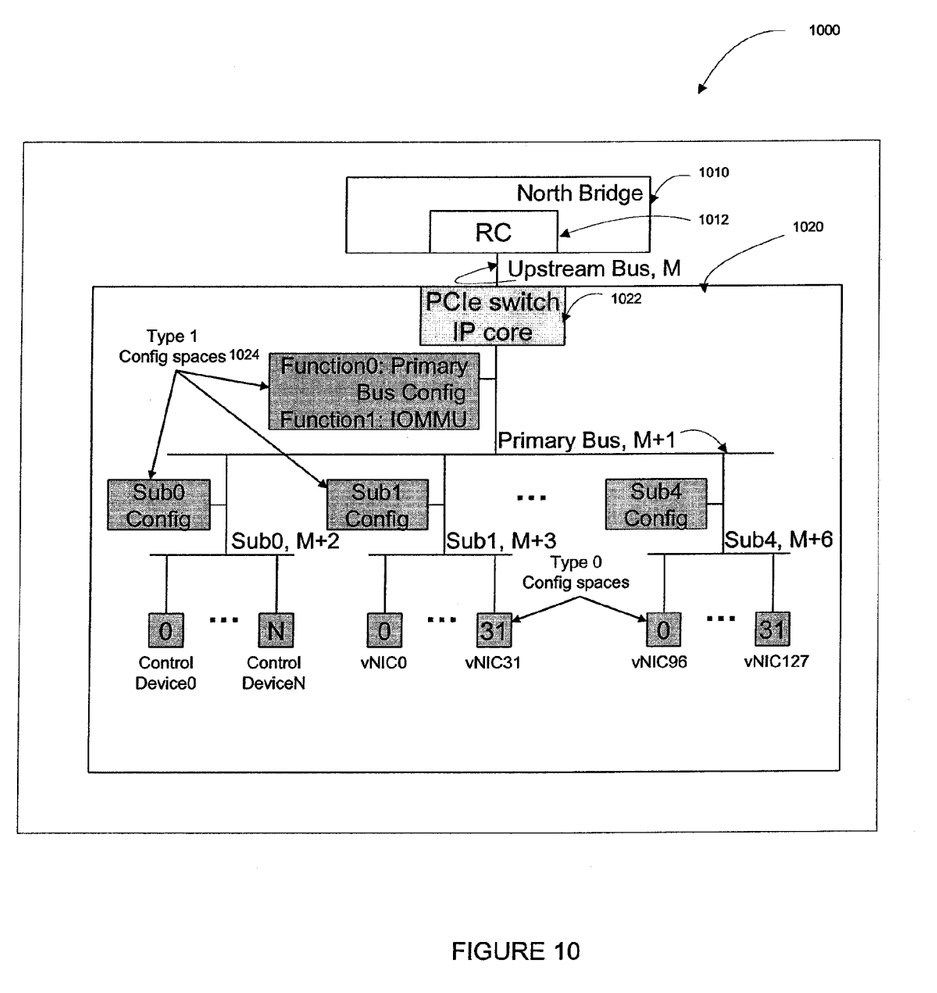
FIG. 10 is a diagrammatic representation of an example topology of virtual I/O devices, in accordance with an example embodiment.

FIG. 10 shows an example PCIe topology that may be created by a consolidated I/O adaptor. As shown in FIG. 10, a consolidated I/O adaptor 1020 is connected to a North Bridge 1010 of a chipset of a host server via an upstream bus M. The upstream bus (M) is connected to a root complex (RC) 1012 of the North Bridge 1010 and to a PCIe IP core 1022 of the consolidated I/O adaptor 1020. The PCIe IP core 1022 is associated with a vendor-provided IP address.

The example topology includes a primary bus (M+1) and secondary buses (Sub0, M+2), (Sub1, M+3), and (Sub4, M+6). Coupled to the secondary bus (Sub0, M+2), there is a number of control devices—control device 0 through control device N. Coupled to the secondary buses (Sub1, M+3) and (Sub4, M+6), there are a number of virtual endpoint devices: vNIC 0 through vNIC N.

Bridging the PCIe IP core 1022 and the primary bus (M+1), there is a Type 1 PCIe device 1024 that provides a basic bridge function, as well as the IOMMU control interface. Bridging the primary bus (M+1) and (Sub0, M+2), (Sub1, M+3), and (Sub4, M+6), there are other Type 1 PCIe devices 1024: (Sub0 config), (Sub1 config), and (Sub4 config).

Depending on the desired system configuration, which, in one example embodiment, is controlled by an embedded management CPU incorporated into the consolidated I/O adaptor 1020, any permissible PCIe topology and device combination can be made visible to the host server. For example, the hardware of the consolidated I/O adaptor 1020, in one example embodiment, may be capable of representing a maximally configured PCIe configuration space which, in one example embodiment, includes 64K devices. Table 3 below details the PCIe configuration space as seen by host software for the example topology shown in FIG. 10.

TABLE 3

| Bus | Dev | Func | Description |
|---|---|---|---|
| Upstream | 0 | 0 | Primary PCI Bus config device, connects upstream port to sub busses |
| Upstream | 0 | 1 | IOMMU control interface |
| Primary | 0 | 0 | Sub0 PCI Bus config device, connects primary bus to sub0 |
| Primary | 1 | 0 | Sub1 PCI Bus config device, connects primary bus to sub1 |
| Primary | 2 | 0 | Sub2 PCI Bus config device, connects primary bus to sub2 |
| Primary | 3 | 0 | Sub3 PCI Bus config device, connects primary bus to sub3 |
| Primary | 4 | 0 | Sub4 PCI Bus config device, connects primary bus to sub4 |
| Primary | 5-31 | | Not configured or enabled in this example system |
| Sub0 | 0 | 0 | Palo control interface. Provides a messaging interface between the host CPU and management CPU. |

TABLE 3-continued

| Bus | Dev | Func | Description |
|---|---|---|---|
| Sub0 | 1 | 0 | Internal "switch" configuration: VLANs, filtering |
| Sub0 | 2 | 0 | DCE port 0, phy |
| Sub0 | 3 | 0 | DCE port 1, phy |
| Sub0 | 4 | 0 | 10/100 Enet interface to local BMC |
| Sub0 | 5 | 0 | FCoE gateway 0 (TBD, if we use ext. HBAs) |
| Sub0 | 6 | 0 | FCoE gateway 1 (TBD, if we use ext. HBAs) |
| Sub0 | 7-31 | | Not configured or enabled in this example system |
| Sub1 | 0-31 | 0 | vNIC0-vNIC31 |
| Sub2 | 0-31 | 0 | vNIC32-vNIC63 |
| Sub3 | 0-31 | 0 | vNIC64-vNIC95 |
| Sub4 | 0-31 | 0 | vNIC96-vNIC127 |
| Sub5-Sub31 | | | Not configured or enabled in this example system |

Figure 11:
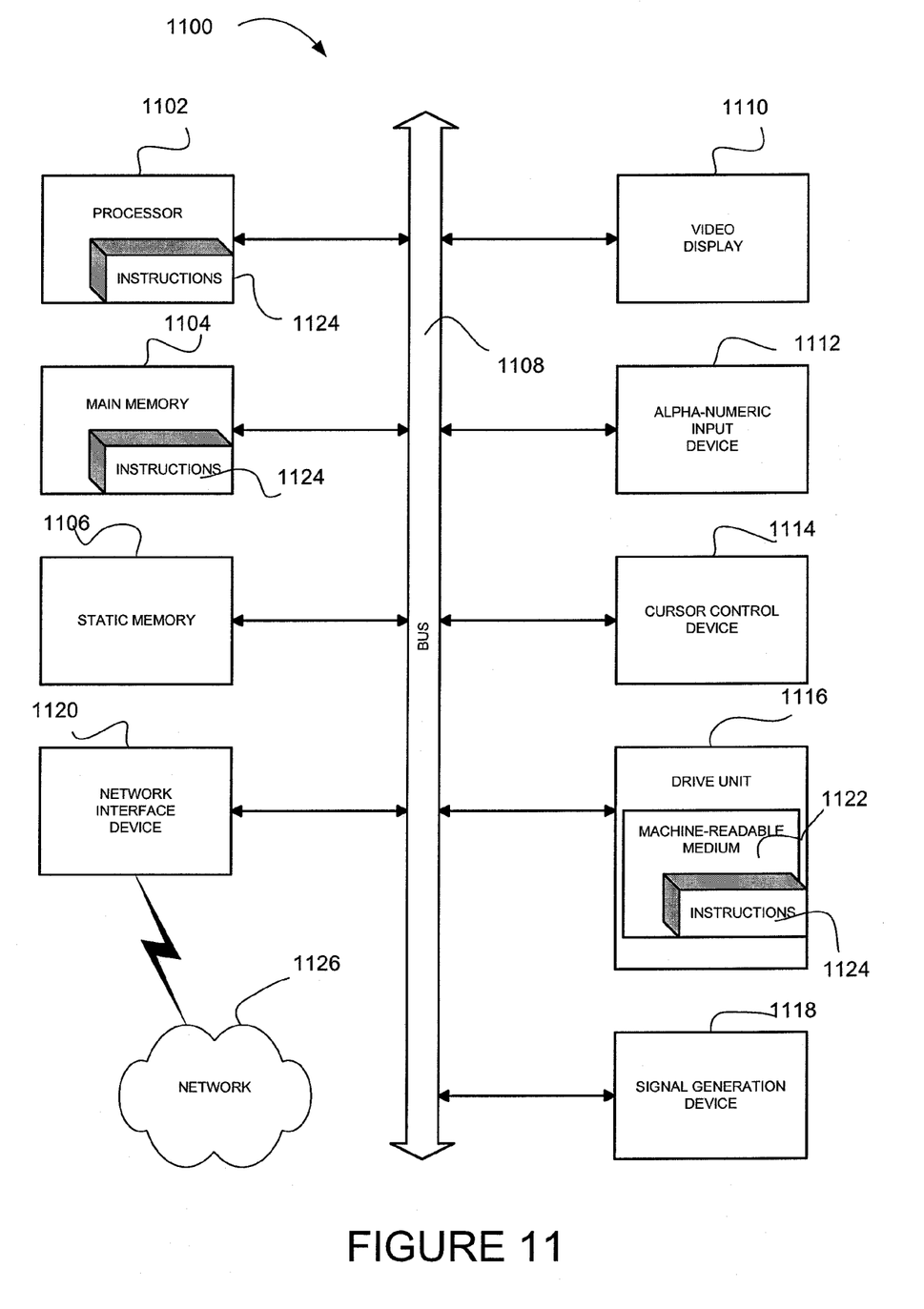
FIG. 11 illustrates a diagrammatic representation of an example machine in the form of a computer system within which a set of instructions, for causing the machine to perform any one or more of the methodologies discussed herein, may be executed.

FIG. 11 shows a diagrammatic representation of machine in the example form of a computer system 1100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a voice mail system, a cellular telephone, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), optionally a user interface (UI) navigation device 1114 (e.g., a mouse), optionally a disk drive unit 1116, a signal generation device 1118 (e.g., a speaker) and a network interface device 1120.

The disk drive unit 1116 includes a machine-readable medium 1122 on which is stored one or more sets of instructions and data structures (e.g., software 1124) embodying or utilized by any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120 utilizing any one of a number of well-known transfer protocols, e.g., a Hyper Text Transfer Protocol (HTTP).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAM), read only memory (ROMs), and the like.

The embodiments described herein may be implemented in an operating environment comprising software installed on any programmable device, in hardware, or in a combination of software and hardware.

Thus, a method and system to map virtual I/O devices and resources to a standard I/O bus have been described. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
 a virtual device detector to detect a virtual Peripheral Component Interconnect Express (PCIe) device;
 a resource allocator to allocate, from a pool of available resources, a plurality of resources to the virtual PCIe device, the resource allocator being implemented in a module comprising hardware;
 an activation module, to generate a set of entries in a resource mapping table, the set of entries corresponding to the allocated plurality of resources, the set of entries to define the virtual PCIe device; and
 a device address mapper to map the virtual PCIe device to a resource address of an allocated resource of the plurality of resources by using:
  a base address register (BAR) match table to store a base address of the virtual PCIe device;
  the resource mapping table to store the set of entries, an entry of the set of entries including a scaling field; and
  a variable address scaling (VAS) module to determine the resource address of the allocated resource based on the scaling field.

2. The system of claim 1, wherein the scaling field is at least one of:
 a mask size to preserve an address bit;
 a shift amount to specify a number of bit positions; or
 a shift direction to specify rightward or leftward bit shift.

3. The system of claim 2, wherein the virtual PCIe device is a virtual Network Interface Card (vNIC).

4. The system of claim 1, wherein the device address mapper is to:
 receive a PCIe address that matches the base address of the virtual PCIe device; and
 provide the resource address of the allocated resource.

5. The system of claim 4, wherein the virtual PCIe device is to provide I/O memory mapping unit (IOMMU) control interface.

6. The system of claim 1, wherein the pool of available resources comprises a plurality of direct memory access (DMA) transmit queues.

7. The system of claim 1, wherein the virtual PCIe device is presented to a host server as a physical PCIe device associated with a particular BAR in a configuration space presented to the host system.

8. The system of claim 7, wherein the BAR match table is a fully associative BAR match table to cache the particular BAR, the particular BAR being stored in a direct mapped storage structure.

9. The system of claim 7, wherein the set of entries in the resource mapping table corresponds to the particular BAR in the configuration space presented to the host system.

10. The system of claim 1, wherein the entry in the set of entries in the resource mapping table is to indicate a target control register in a physical address space associated with an adaptor to maintain the virtual PCIe device.

11. The system of claim 1, wherein the resource allocator is to allocate the plurality of resources to the virtual PCIe device such that the allocated resources are for exclusive use by the virtual PCIe device.

12. A method comprising:
    detecting a virtual Peripheral Component Interconnect Express (PCIe) device;
    allocating, from a pool of available resources, a plurality of resources to the virtual PCIe device, the allocating being performed by a module comprising hardware;
    generating a set of entries in a resource mapping table, the set of entries corresponding to the allocated plurality of resources, the set of entries to define the virtual PCIe device; and
    mapping the virtual PCIe device to a resource address of an allocated resource of the plurality of resources by using:
        a base address register (BAR) match table to store a base address of the virtual PCIe device;
        the resource mapping table to store the set of entries, an entry of the set of entries including a scaling field; and
        a variable address scaling (VAS) module to determine the resource address of the allocated resource based on the scaling field.

13. The method of claim 12, wherein the scaling field is at least one of:
    a mask size to preserve an address bit;
    a shift amount to specify a number of bit positions; or
    a shift direction to specify rightward or leftward bit shift.

14. The method of claim 12, wherein the virtual PCIe device is a virtual Network Interface Card (vNIC).

15. The method of claim 12, further comprising:
    receiving a PCIe address that matches the base address of the virtual PCIe device; and
    providing the resource address of the allocated resource.

16. The method of claim 15, wherein the virtual PCIe device is to provide I/O memory mapping unit (IOMMU) control interface.

17. The method of claim 12, wherein the pool of available resources comprises a plurality of direct memory access (DMA) transmit queues.

18. The method of claim 12, comprising presenting the virtual PCIe device to a host server as a physical PCIe device associated with a particular BAR in a configuration space presented to the host system.

19. The method of claim 18, including:
    storing the particular BAR in the BAR match table; and wherein
    the BAR match table is a direct mapped storage structure; and
    the BAR match table is a fully associative BAR match table.

20. The method of claim 18, wherein the set of entries in the resource mapping table corresponds to the particular BAR in the configuration space presented to the host system.

21. The method of claim 12, wherein the entry in the set of entries in the resource mapping table is to indicate a target control register in a physical address space associated with an adaptor to maintain the virtual PCIe device.

22. The method of claim 12, wherein the allocating of the plurality of resources comprises allocating the plurality of resources such that the allocated resources are for exclusive use by the virtual PCIe device.

* * * * *